(12) United States Patent
Baumgartner et al.

(10) Patent No.: US 6,959,788 B2
(45) Date of Patent: Nov. 1, 2005

(54) DISK BRAKE WITH A BRAKE LINING HOLDING DEVICE AND BRAKE LINING

(75) Inventors: Hans Baumgartner, Moosburg (DE); Johann Iraschko, Schweitenkirchen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/269,093

(22) Filed: Oct. 11, 2002

(65) Prior Publication Data

US 2003/0085083 A1    May 8, 2003

Related U.S. Application Data

(63) Continuation of application No. PCT/EP01/03813, filed on Apr. 4, 2001.

(30) Foreign Application Priority Data

Apr. 13, 2000   (DE) ................................ 100 18 523

(51) Int. Cl.$^7$ ............................................. F16D 65/04
(52) U.S. Cl. ............................ 188/1.11 W; 188/241; 188/250 B
(58) Field of Search ........................ 188/1.11 W, 340, 188/341, 218 XL, 241, 258, 259, 250 D, 188/250 E, 250 F, 250 B

(56) References Cited

U.S. PATENT DOCUMENTS

| 3,396,824 A | | 8/1968 | Meier |
| 3,665,231 A | * | 5/1972 | Wendler .................... 310/77 |
| 4,364,455 A | * | 12/1982 | Oshima ................ 188/1.11 W |
| 4,629,037 A | | 12/1986 | Madzgalla et al. |

FOREIGN PATENT DOCUMENTS

| DE | 2250742 | 4/1974 |
| DE | 19823034 | 12/1999 |
| GB | 1470919 | 4/1977 |

* cited by examiner

*Primary Examiner*—Xuan Lan Nguyen
(74) *Attorney, Agent, or Firm*—Crowell & Moring LLP

(57) ABSTRACT

The invention concerns a disk brake with a brake lining holding device for a brake lining that can be tensioned in the direction of a brake disk and comprising a lining support plate and a brake lining material applied thereon, wherein a limit stop for limiting the adjustment path of the brake lining is provided. The invention is characterized in that the limit stop for limiting the adjustment path of the brake lining can be elastically and/or plastically deformed under the effect of a given brake force produced by the disk brake.

19 Claims, 2 Drawing Sheets

DISK BRAKE WITH A BRAKE LINING HOLDING DEVICE AND BRAKE LINING

BACKGROUND AND SUMMARY OF THE INVENTION

This application is a continuation of International Patent Application No. PCT/EP01/03813, filed Apr. 4, 2001. Priority is claimed based on Federal Republic of Germany patent Application No. DE 100 18 523.1, filed Apr. 13, 2000, the entire disclosure of which is hereby incorporated herein by reference.

The invention relates to a disk brake with a brake lining holding device for a brake lining which can be applied in the direction of a brake disk. The brake lining has a lining supporting plate with a brake lining material arranged thereon. A stop is provided for limiting the adjusting path of the brake lining. The invention also relates to a brake lining for such a disk brake.

A disk brake of this type is known from British Patent Document GB 1470919. In the case of the disk brake disclosed in this document, the caliper section carrying the rim-side brake lining is impacted when the wear limit of the lining has been reached.

This takes place because, in the case of sliding-caliper or fixed-caliper disk brakes of the known constructions, there is the problem that, when the wear of the brake lining and/or the brake disk is excessive, the brake lining is displaced so far in the direction of the brake disk that there is no longer a sufficient overlap of the brake lining with the supporting surfaces of the caliper or brake anchor plate and, during the operation of the brake, the brake lining is pulled into the gap between the brake lining holding device of the caliper or brake anchor plate and the brake disk.

The results of such a fault may be serious. Thus, the clamped-in brake lining may lock up the wheel during the drive, which may result in damage to the tire and the axle. According to the finding of the invention, this fault will occur particularly when influences exist which cause a very non-uniform wear between the two brake linings so that the critical wear condition of one of the two brake linings will occur unexpectedly early for the operator of the vehicle. Such influences may, for example, be considerable accumulations of dirt on only one of the two brake disk friction surfaces or a sluggish sliding guidance of a sliding caliper disk brake.

The early wear of an individual lining is particularly problematic when wear monitoring systems do not indicate this condition in time.

Measures are known for preventing the excessive wear which, however, do not have a sufficient effect and/or unacceptably impair the effect of the brake in emergency braking situations.

Thus, for example, the excessive wear of the outer brake lining in the case of sliding caliper disk brakes can be avoided in that, when the limit wear condition is reached, the slidability of the caliper is limited by a stop. This solution for the outer brake lining is implemented in series production, for example, in the case of sliding caliper disk brakes of Knorr-Bremse Systems for Commercial Vehicles with the commercial designation of SB Series (for example, SB6000, SB7000).

Another possible measure is a limitation of the adjusting rotation movement of the threaded spindles of the wear adjusting system. As a result, it can be avoided that the total wear of both brake linings together exceeds a permissible value. When a high non-uniform wear occurs, this measure is, however, not effective for the brake lining with the most extensive wear.

It has also been suggested to construct the axle-fixed brake lining holder such that the application force of the caliper is absorbed by the brake lining holder when the critical wear condition is reached and the brake linings are no longer brought in contact with the brake disk. However, this suggestion results in the problem of the reduction or of the complete failure of the braking effect in the event of an emergency braking (see, for example, German Patent Document DE 198 23 034 C1).

Based on the above-mentioned prior art, the invention relates to the problem of further developing a disk brake of the above-mentioned type such that a reliable wear adjusting limitation is implemented for the brake linings without the danger that the braking effect of the disk brake is significantly reduced in emergency situations.

The invention achieves this goal by providing a disk brake with a brake lining holding device for a brake lining which can be applied in the direction of a brake disk and has a lining supporting plate and a brake lining material arranged thereon. A stop is provided for limiting the adjusting path of the brake lining. The stop is elastically and/or plastically deformable under the effect of a given brake application force which can be generated by the disk brake for limiting the adjusting path of the brake lining. Accordingly, the stop for limiting the adjusting path of the brake lining is elastically and/or plastically deformable under the effect of a given brake application force which can be generated by the disk brake.

The invention also provides a particularly advantageous brake lining for use in a disk brake, particular a disk brake according to the invention. Accordingly, the brake lining has a projection or a recess for the interaction preferably with a recess or a projection—with the disk brake, so that a stop is formed between the brake lining and the disk brake. This stop can be elastically and/or plastically deformed when a limit application force is exceeded. The stop can also be formed in that only the brake lining has a projection which limits the displacement path of the brake lining support.

It is essential to the invention that an elastically or plastically deformable element is constructed either at the brake lining (support) and/or at the remaining disk brake or its lining holding device—for example, implemented at the caliper or at the brake anchor plate. This element is constructed such that, although it limits the adjusting path of the brake lining per se, it yields when a limit force is exceeded so that, at high braking forces, despite largely worn linings, a braking can still take place by means of the corresponding brake lining.

According to the invention, when the limit wear condition has been reached, the brake linings, by means of their lining supporting plate, come in contact with the stop—for example, at the axle-fixed brake lining holding device, by means of which contact, a further displacement of the brake linings is prevented for a given amount of the brake operating force. When this given operating force is exceeded, however, by means of the elastic and/or plastic deformation of the supporting elements at the brake lining or the brake lining holding device, an additional displacement path is opened up and thus an additional wear of the respective brake lining can occur for implementing at least one emergency braking operation.

Thus, in the invention, a disk brake and a brake lining particularly suitable for this disk brake are provided which, by means of simple constructive measures, are designed for avoiding, when the limit wear condition of one or both brake linings has been reached, the further wear of already worn brake linings during usual adaptation brakings. Nevertheless, in the event of an emergency braking, even the already worn brake linings are brought in contact with the brake disk for generating a sufficient braking effect.

According to a particularly preferred embodiment of the invention, the stop is designed such that, when a first given limit brake application force is exceeded, it is first elastically deformable and then, when a second higher limit brake application force is exceeded, it is plastically deformable.

Cost-effective constructive variants of the invention are formed in that:

a) the stop at the brake lining holding device of a sliding caliper disk brake has at least one recess on the brake anchor plate;

b) or that the stop at the brake lining holding device of a fixed caliper disk brake has a recess formed at the caliper, c) in which recess at least one projection of the brake lining support engages which, when the limit brake application force is exceeded, is elastically and/or plastically deformable.

Depending on the design of the disk brake and the pertaining linings, it is basically contemplated that the at least one projection is constructed in one piece with the brake lining support, or is constructed as a separate element, which can be connected with the lining supporting plate.

According to a preferred variant of the invention which makes the production of the brake lining support only insignificantly more expensive, the at least one projection is constructed as the end of a bendable tongue which is molded or fitted to the brake lining support. Preferably, one of the bending tongues, respectively, is arranged relative to the brake disk rotating direction in the inlet and/or outlet area of the brake lining support. In addition, the recesses in the caliper or the brake lining support have a depth such that, when the limit wear condition is reached, a stop is formed for the projections of the lining supporting plate.

It is also contemplated that the at least one stop on the brake lining supporting surfaces of the brake lining holding device comprises molded-on or attached elements which are constructed in one piece with the brake lining holding device or are connected with it.

Other objects, advantages and novel features of the present invention will become apparent from the following detailed description of the invention when considered in conjunction with the accompany drawings.

BRIEF DESCRIPTION OF THE DRAWINGS

In the following, the invention will be explained by means of embodiments with respect to the drawing.

DETAILED DESCRIPTION OF THE DRAWINGS

Figure 1A:
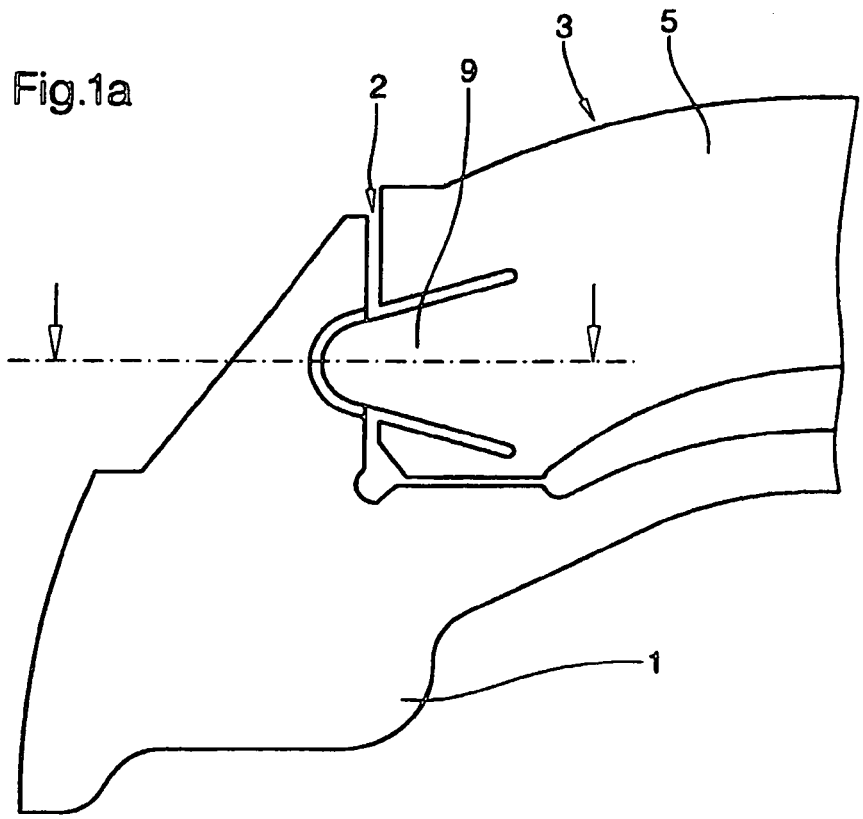
FIGS. 1a, b are a lateral view and a sectional view, respectively, of sections of the disk brake according to the invention with brake lining holding devices constructed at the brake anchor plate.
Figure 1B:
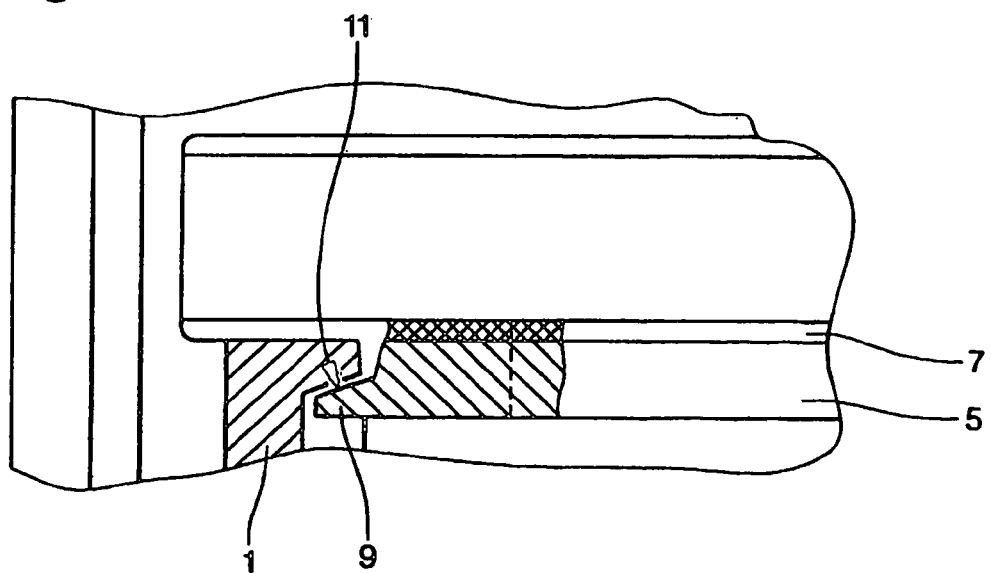

FIGS. 1a and 1b shows a brake anchor plate 1 of a sliding caliper disk brake, as it can, for example, be used in an electromechanical, pneumatic or hydraulic operation of commercial vehicles. A lining shaft 2 of the brake anchor plate 1 is used as a brake lining holding device.

A brake lining 3 with a brake lining support 5 and a brake lining material 7 fastened thereon is inserted in the lining shaft 2, which brake lining material 7—as illustrated in FIG. 1b—is already relatively worn.

In the lateral area (inlet area) of the brake disk 21, the brake lining support 5 is provided with a lateral projection 9, which is constructed as a bending tongue which is cut into the sides of the brake lining support 5. This bending tongue 9 engages in a complementary recess 11 of a brake lining holding device of the brake anchor plate 1. Although here the projections constructed as bending tongues 9 with a given bending length and bending stiffness are constructed in one piece with the lining support plate 5, they may also be a component of a separate structural element which is fixedly connected with the lining support plate 5 by welding, riveting, etc.

The recesses 11 in the brake lining holding device of the brake anchor plate 1 are limited in their depth in such a manner that, when the limit wear condition for the bending tongues 9 is reached, a displacing path limitation is formed in the form of a stop.

When the limit wear condition is reached, the brake lining support 5, on both ends, by way of the cut-free bending tongues 9, will come in contact with the end walls at the end of the recess 11 of the brake anchor plate 1, and a further displacement of the brake lining 3 is prevented at first. However, when the brake operating force exceeds a certain defined level, the cut-free bending tongues 9 of the brake lining support 5 are loaded with an excessive bending torque so that they are at first elastically deformed and, as the loading increases, are also slightly plastically deformed. As a result, the additional displacement path of the brake lining 3 required for implementing at least one emergency braking is opened up and the brake lining contacts the brake disk 21.

Figure 2A:
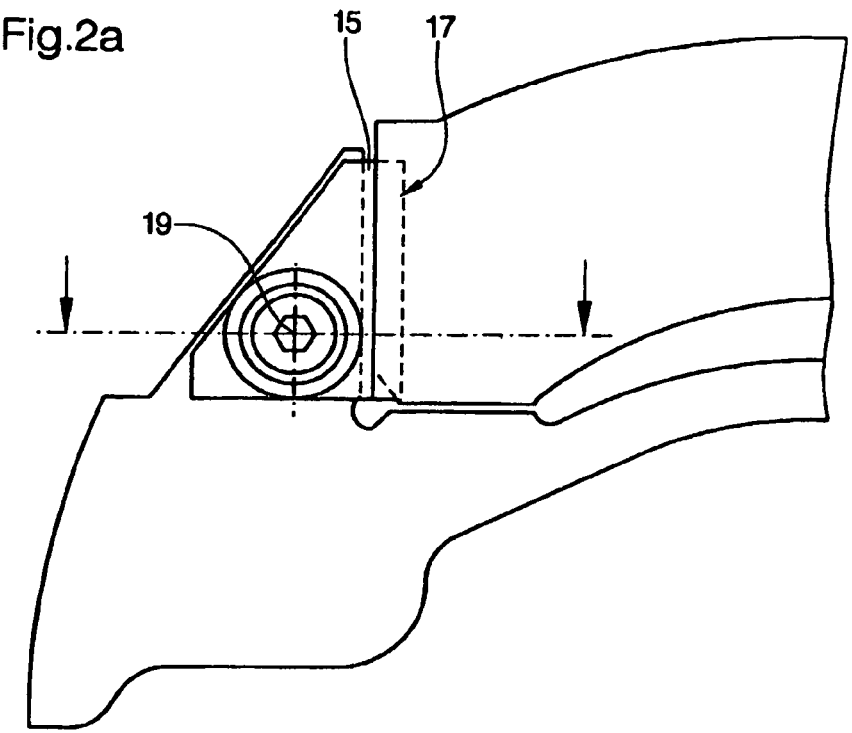
FIGS. 2a, b are a lateral view and a sectional view, respectively, of sections of another disk brake according to the invention with brake lining holding devices constructed at the brake anchor plate.
Figure 2B:
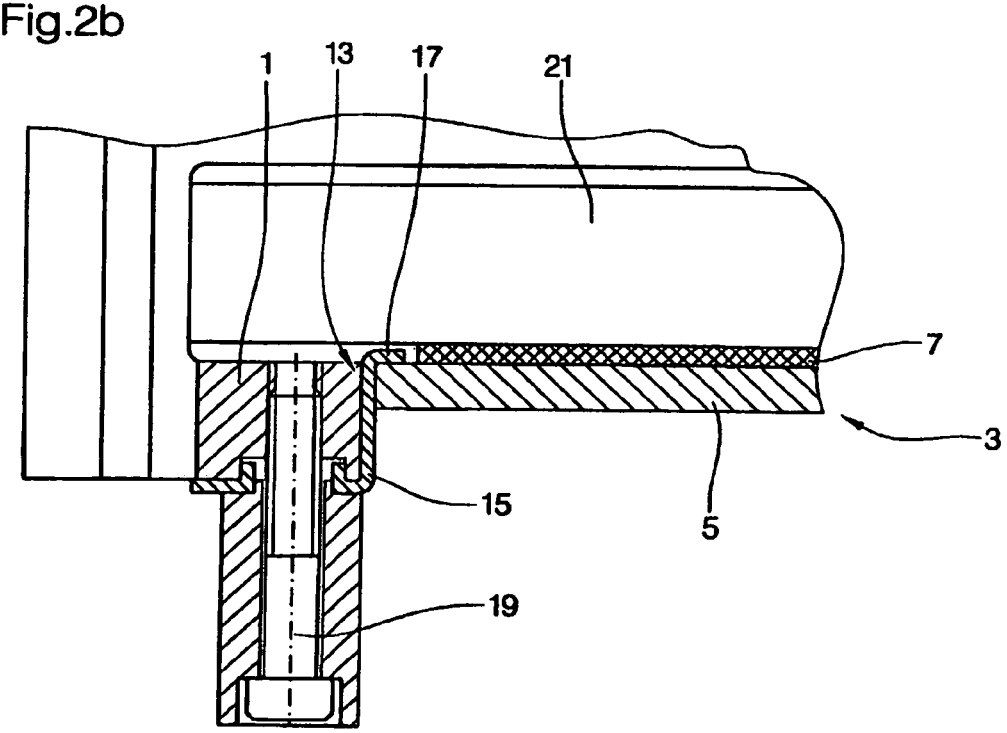

In the embodiment according to FIGS. 2a and 2b, the stop on the brake lining support surfaces 13 of the brake lining holding device is implemented by angled sheet elements 15 screwed or firmly connected in another manner to the brake lining holding device. These angled sheet elements 15 preferably consist of high-strength steel plates and, at the end facing the brake disk, are equipped with a bend 17 pointing in the direction of the brake lining 3, and are fastened by means of bolts 19 to the brake lining support, for example, to the caliper bearing devices.

On both sides, the brake lining 3 is, by means of its lining support 5, in an operative connection with the stop elements 15. When the limit wear condition has been reached, the brake lining support 5 comes in contact with the bends 17 of the angled elements 15, and the further displacement of the brake lining 3 is at first prevented. When the given operating force of the brake is exceeded, the additional displacement path of the brake lining 3 required for the implementation of at least one emergency braking is opened up by an elastic and/or plastic deformation of the bends 17 (and/or—not shown here—the bending tongues 9) in the above-described manner.

In the embodiment of FIGS. 2a and 2b, when the bends 17 are correspondingly dimensioned, it is also possible to produce the required deformation for opening up the additional wear path by means of the angled element 15. In this case, the angled elements 15 have to be exchanged when the limit wear condition was exceeded. However, it is not absolutely necessary to construct a bending tongue 9 on the brake lining 3 so that the expenditures for the cutting-in of the bending tongue 9 can be avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Table of Reference Numbers
Brake carrier plate 1
lining shaft 2
brake lining 3
brake lining support 5
brake lining material 7
projection, bending tongue 9
recess 11
brake lining supporting surfaces 13
angled sheet elements 15
bend 17
bolt 19
brake disk 21

What is claimed is:

1. A disk brake, comprising:
   a brake lining having a brake lining support plate and a lining material with a given limit wear condition, the brake lining being displaceable over a displacement path to effect braking;
   a brake lining holding device for the brake lining;
   a stop configured to prevent a further displacement of the brake lining under normal braking condition for a first given amount of brake application force when the given limit wear condition is met, wherein the stop is designed such that, when the first given limit brake application force is exceeded, the stop is at first elastically deformed to allow for additional displacement of the brake lining and, when a second given, higher limit brake application force is exceeded, the stop is plastically deformed.

2. The disk brake according to claim 1, wherein for a sliding caliper disk brake, at the brake lining holding device the stop has at least one recess on a brake carrier; and
   wherein at least one projection of the brake lining support plate engages into the recess, when the first given brake application force is exceeded, the projection is at least one of elastically and plastically deformable.

3. The disk brake according to claim 2, wherein the stop includes at least one of:
   at least one projection constructed in one-piece with the brake lining support plate; and
   at least one projection constructed as a separate element connectable with the brake lining support plate.

4. The disk brake according to claim 2, wherein the at least one recess in the brake carrier has a depth such that, when the given limit wear condition is reached, the at least one projection of the brake lining support plate rests on the brake carrier.

5. The disk brake according to claim 1, wherein for a sliding caliper disk brake, at the brake lining holding device the stop has at least one recess on a brake carrier; and
   wherein at least one projection of the brake lining support plate engages into the recess, when the first and second given brake application forces are exceeded, the projection is elastically and plastically deformable, respectively.

6. The disk brake according to claim 1, wherein for a fixed caliper disk brake, at the brake lining holding device the stop has a recess formed on a caliper; and
   wherein at least one projection of the brake lining support plate engages into the recess, when the first given brake application force is exceeded, the projection is elastically and plastically deformable.

7. The disk brake according to claim 6, wherein the stop includes at least one of:
   at least one projection constructed in one-piece with the brake lining support plate; and
   at least one projection constructed as a separate element connectable with the brake lining support plate.

8. The disk brake according to claim 6, wherein the recess in the caliper has a depth such that, when the given limit wear condition is reached, the at least one projection of the brake lining support plate rests on the caliper.

9. The disk brake according to claim 1, wherein for a fixed caliper disk brake, at the brake lining holding device the stop has a recess formed on a caliper; and
   wherein at least one projection of the brake lining support plate engages into the recess, when the first and second given brake application forces are exceeded, the projection is elastically and plastically deformable respectively.

10. The disk brake according to claim 1, wherein the stop includes at least one of:
    at least one projection constructed in one-piece with the brake lining support plate; and
    at least one projection constructed as a separate element connectable with the brake lining support plate.

11. The disk brake according to claim 1, wherein the stop includes at least one of:
    at least one projection constructed in one-piece with the brake lining support plate; and
    at least one projection constructed as a separate element connectable with the brake lining plate.

12. The disk brake according to claim 1, wherein the stop has, on brake lining support surfaces of the brake lining holding device, at least one of molded-on and attached elements constructed in one-piece with the brake lining holding device or connected with the brake lining holding device, respectively.

13. The disk brake according to claim 12, wherein the attached elements are constructed as angled sheet elements attachable to a brake carrier or caliper, the angled sheet elements having a bend pointing in a direction of the brake lining at an end facing the brake disk, which bend limits a displacement path of the brake lining.

14. The disk brake according to claim 1, wherein the stop includes at least one projection constructed as an end of a bendable tongue forming part of the brake lining support plate.

15. The disk brake according to claim 14, wherein one of a plurality of bendable tongues of the brake lining support plate are respectively arranged relative to the brake disk rotational direction in an inlet and an outlet area of the brake disk.

16. The disk brake according to claim 14, wherein the bendable tongue has a given bending length on the brake lining support plate.

17. The disk brake according to claim 14, wherein the bendable tongue is fastened as a separate component with a corresponding bending length on the brake lining support plate.

18. A brake lining displaceable over a displacement path to effect braking of a disk brake, comprising:
    a brake lining support;
    a brake lining material with a given limit wear condition arranged on the brake lining support;

wherein the brake lining support has at least one of a projection and recess adapted to interact with the disk brake to form a stop between the brake lining and the disk brake preventing further displacement of the brake lining under normal braking conditions for a first given amount of brake application force when the given limit wear condition is met; and further wherein the stop is designed such that, when the first given limit brake application force is exceeded, the stop is at first elastically deformed to allow for additional displacement of the brake lining and, when a second given, higher limit brake application force is exceeded, the stop is plastically deformed.

19. A method for operating a disk brake having a brake lining holding device for a brake lining that is displaceable over a displacement path in a direction of a brake disk to effect braking and has a lining support plate with a brake lining material arranged thereon, the brake lining material having a given limit wear condition, the method comprising the acts of:

upon meeting the given limit wear condition of the brake lining material, preventing further displacement of the brake lining during braking under normal braking condition for a first given brake application force via a stop;

upon exceeding the first given brake application force, elastically deforming the stop to allow for additional displacement of the brake lining;

upon exceeding a second given, higher, brake application force, plastically deforming the stop to allow for additional displacement of the brake lining.

* * * * *